(12) United States Patent
McIlwraith et al.

(10) Patent No.: US 8,887,618 B2
(45) Date of Patent: Nov. 18, 2014

(54) PRESSURE WAVE GENERATOR WITH MOVABLE CONTROL ROD FOR GENERATING A PRESSURE WAVE IN A MEDIUM

(75) Inventors: Lon McIlwraith, Delta (CA); John Senger, New Westminster (CA); Darcy Montgomery, Burnaby (CA); Douglas H. Richardson, Anmore (CA); Peter Kostka, Vancouver (CA); Kristin Bell, Burnaby (CA); Ryan Zindler, Surrey (CA); Michel Georges Laberge, West Vancouver (CA)

(73) Assignee: General Fusion, Inc. (CA)

( * ) Notice: Subject to any disclaimer, the term of this patent is extended or adjusted under 35 U.S.C. 154(b) by 0 days.

(21) Appl. No.: 14/000,725
(22) PCT Filed: Feb. 8, 2012
(86) PCT No.: PCT/CA2012/000133
§ 371 (c)(1),
(2), (4) Date: Aug. 21, 2013
(87) PCT Pub. No.: WO2012/113057
PCT Pub. Date: Aug. 30, 2012

(65) Prior Publication Data

US 2014/0165552 A1    Jun. 19, 2014

Related U.S. Application Data

(60) Provisional application No. 61/446,965, filed on Feb. 25, 2011.

(51) Int. Cl.
| | | |
|---|---|---|
| *B01J 3/08* | (2006.01) | |
| *F16J 1/20* | (2006.01) | |
| *F15B 21/12* | (2006.01) | |
| *G10K 15/04* | (2006.01) | |
| *F03G 7/00* | (2006.01) | |

(52) U.S. Cl.
CPC ............... *F15B 21/12* (2013.01); *G10K 15/04* (2013.01); *F03G 7/002* (2013.01)
USPC .................... 91/394; 92/128; 92/138; 92/191

(58) Field of Classification Search
CPC ....... F15B 14/1447; F15B 14/148; F16J 1/10; F16J 1/20; F16J 1/24; B01J 3/08
USPC ............ 91/394; 92/85 B, 128, 138, 187, 191; 188/267.1, 267.2; 267/126
See application file for complete search history.

(56) References Cited

U.S. PATENT DOCUMENTS

| | | | |
|---|---|---|---|
| 2,715,389 A | | 8/1955 | Johnson |
| 3,309,967 A | * | 3/1967 | Taplin .............................. 92/101 |

(Continued)

FOREIGN PATENT DOCUMENTS

| | | |
|---|---|---|
| CA | 2262581 | 2/1998 |
| CA | 2750441 | 4/2012 |

(Continued)

OTHER PUBLICATIONS

B. E. McDonald, "Modeling nonlinear compressional waves in marine sediments", Nonlin. Processes Geophys., vol. 16, Feb. 26, 2009, pp. 151-157.

(Continued)

*Primary Examiner* — F. Daniel Lopez
(74) *Attorney, Agent, or Firm* — Knobbe, Martens, Olson & Bear, LLP (57) ABSTRACT

Examples of a pressure wave generator configured to generate high energy pressure waves in a medium are disclosed. The pressure wave generator can include a movable piston with a guide through which a piston control rod can move or slide. The pressure wave generator can include a transducer coupled to a medium. During an impact of the piston on the transducer, the control rod can slide in the guide, which can reduce stress on the rod. The pressure wave generator can include a damper to decelerate the control rod, independently of the piston. Impact of the piston on the transducer transfers a portion of the piston's kinetic energy into the medium thereby generating pressure waves in the medium. A piston driving system may be used to provide precise and controlled launching or movement of the piston. Examples of methods of operating the pressure wave generator are disclosed.

12 Claims, 5 Drawing Sheets

(56) References Cited

U.S. PATENT DOCUMENTS

| | | | |
|---|---|---|---|
| 3,341,189 | A | 9/1967 | Rumsey |
| 3,346,458 | A | 10/1967 | Schmidt |
| 3,465,742 | A | 9/1969 | Herr |
| 3,503,472 | A | 3/1970 | Axthammer |
| 3,631,760 | A | 1/1972 | Moran |
| 3,753,304 | A | 8/1973 | Hughes |
| 3,990,351 | A | 11/1976 | Sundin |
| 4,026,192 | A * | 5/1977 | Noren et al. .......... 92/85 B |
| 4,049,367 | A | 9/1977 | Tominaga et al. |
| 4,196,788 | A | 4/1980 | Sciard |
| 4,284,164 | A * | 8/1981 | Airhart .......... 181/117 |
| 4,367,130 | A | 1/1983 | Lemelson |
| 4,385,880 | A | 5/1983 | Lemelson |
| 4,449,892 | A | 5/1984 | Bentley |
| 4,930,355 | A | 6/1990 | Heck |
| 5,087,435 | A | 2/1992 | Potter et al. |
| 5,114,261 | A * | 5/1992 | Sugimoto et al. .......... 92/187 |
| 5,394,131 | A | 2/1995 | Lungu |
| 6,532,887 | B1 | 3/2003 | Venier et al. |
| 6,837,145 | B1 * | 1/2005 | McBride et al. .......... 92/187 |
| 7,100,494 | B2 * | 9/2006 | Petersen et al. .......... 92/187 |
| 7,559,542 | B2 | 7/2009 | Cotter |
| 2005/0129161 | A1 | 6/2005 | Laberge |
| 2006/0198483 | A1 | 9/2006 | Laberge |
| 2006/0198486 | A1 | 9/2006 | Laberge et al. |
| 2009/0059718 | A1 | 3/2009 | Tessien |
| 2009/0213976 | A1 | 8/2009 | Gioscia et al. |
| 2010/0163130 | A1 | 7/2010 | Laberge et al. |
| 2011/0293056 | A1 | 12/2011 | Slough |

FOREIGN PATENT DOCUMENTS

| | | |
|---|---|---|
| WO | WO 91/10242 A2 | 7/1991 |
| WO | WO 93/23587 A1 | 11/1993 |
| WO | WO 96/36969 | 11/1996 |
| WO | WO 2010/114360 A1 | 10/2010 |
| WO | WO 2012/113057 A1 | 8/2012 |

OTHER PUBLICATIONS

Ch. Mangeant et al., "Syrinx Project: Compact Pulse-Current Generators Devoted to Material Study Under Isentropic Compression Loading", in Pulsed Power Plasma Science, IEEE, Jun. 2001, in 4 pages.

D. Orlikowski et al., "New experimental capabilities and theoretical insights of high pressure compression waves", Lawrence Livermore National Laboratory, UCRL-PROC-233023, Jul. 24, 2007, 10 pages.

Gregory H. Miller et al., "The Equation of State of a Molten Komatiite 1. Shock Wave Compression to 36 GPa", Journal of Geophysical Research, vol. 96, No. B7, Jul. 10, 1991, pp. 11,831-11,848.

Hitoshi Takeuchi et al., "Equations of State of Matter from Shock Wave Experiments", Journal of Geophysical Research, vol. 71, No. 16, Aug. 15, 1966, pp. 3985-3994.

J. Nguyen et al., "Specifically Prescribed Dynamic Thermodynamic Paths and Resolidification Experiments", Lawrence Livermore National Laboratory, UCRL-JRNL-201169, Nov. 25, 2003, in 8 pages.

R. S. Hawke, "Design and Analysis of Isentropic Compression Experiments", Lawrence Livermore Laboratory, Preprint UCRL-81797, May 7, 1979, in 23 pages.

R.G. Kraus et al., "Equation of state of ductile granular materials", DYMAT International Conference on Mechanical and Physical Behaviour of Materials, Sep. 2009, pp. 1317-1323.

Robert S. Hixson et al., "Shock Compression Techniques for Developing Multiphase Equations of State", Los Alamos Science, No. 28, Jan. 2003, pp. 114-119.

Thomas S. Duffy et al., "Compressional sound velocity, equation of state, and constitutive response of shock-compressed magnesium oxide", Journal of Geophysical Research, vol. 100, No. B1, pp. 529-542, Jan. 10, 1995.

V.V. Prut et al., "Metallic Z-pinch method: the isentropic compression of hydrogen", JETP Lett. vol. 29, No. 1, Jan. 5, 1979, pp. 30-33.

W. J. Nellis et al., "Equation of state of shock-compressed liquids: Carbon dioxide and air", J. Chem. Phys., vol. 95 (7), Oct. 1, 1991, pp. 5268-5272.

M. Delage et al., "Progress Towards Acoustic Magnetized Target Fusion: An Overview of the R&D Program at General Fusion," 33rd Ann. Conf. Can. Nuc. Soc., Jun. 2012, in 13 pages.

Michel LaBerge, "Experimental Results for an Acoustic Driver for MTF," Journal of Fusion Energy, Jun. 2009, vol. 28, No. 2, pp. 179-182, available Jun. 2008.

International Search Report and Written Opinion for International Application No. PCT/CA2012/000133, mailed Jun. 1, 2012, in 7 pages.

* cited by examiner

PRESSURE WAVE GENERATOR WITH MOVABLE CONTROL ROD FOR GENERATING A PRESSURE WAVE IN A MEDIUM

CROSS-REFERENCE TO RELATED APPLICATIONS

This application is a U.S. National Phase of International Application No. PCT/CA2012/000133, filed Feb. 8, 8012, which claims the benefit of priority under 35 U.S.C. §119(e) to U.S. Provisional Patent Application No. 61/446,965, filed Feb. 25, 2011, entitled "PRESSURE WAVE GENERATOR WITH MOVABLE CONTROL ROD FOR GENERATING A PRESSURE WAVE IN A MEDIUM," each of which is hereby incorporated by reference herein in its entirety.

BACKGROUND

1. Technical Field

The present disclosure relates generally to a pressure wave generator for generating pressure waves in a medium.

2. Description of the Related Art

Various chemical reactions which are difficult to produce at low temperatures or pressures can be made to occur rapidly and efficiently at higher temperatures and pressures. Pressure wave generators can be used to create pressure waves that may be used to compress a medium, transfer part of the pressure wave energy to that medium, generate energy in the medium due to concentration of the pressure wave energy, and/or initiate chemical reactions or physical changes in the medium. The medium may be a solid, liquid, or gas.

SUMMARY

Various examples of pressure wave generators and methods for using pressure wave generators are provided. In various implementations, the methods and generators can be used to generate, augment, and/or utilize high intensity pressure waves directed into a reaction chamber in order to initiate or increase the efficiency of chemical or physical reactions in a medium in the chamber. For example, embodiments of the methods and generators can be used to increase temperature, pressure, energy, and/or density of the medium so that reactions that are difficult or uneconomical to attain at lower temperatures, pressures, energies, and/or densities can be made to occur more rapidly and/or efficiently at higher temperatures, pressures, energies, and/or densities provided by embodiments of the methods and generators described herein.

In one aspect, a pressure wave generator having a piston is provided with a control rod that moves forward into the piston during impact of the piston with a transducer coupled to the medium.

In another aspect, a pressure wave generator includes a control rod that can move or slide within a guide in a piston. The pressure wave generator includes a damper system configured to decelerate the control rod independently of the piston.

In yet another aspect, a pressure wave generator is provided with a piston launching and driving mechanism that comprise a series of valves for directly injecting high pressure gas behind the piston to initiate movement of the piston. As the piston moves along an inner bore of a pressure wave generator housing, the piston uncovers or opens gas ports in the housing, which allows additional high pressure gas to be injected to apply additional motive force to the piston so as to accelerate the piston toward a transducer coupled to a medium.

In one aspect, the pressure wave generator comprises a movable piston having a first surface and a second surface and a longitudinal axis between the first surface and the second surface. The piston comprises a guide extending along the longitudinal axis of the piston from the first surface at least partially toward the second surface. The pressure wave generator also comprises a housing having an inner bore, a first end, and a second end, with the piston being at least partially disposed within the inner bore of the housing. The piston is movable within the inner bore of the housing from the first end toward the second end along a direction parallel to the longitudinal axis of the piston. The pressure wave generator also comprises a control rod extending longitudinally from a first end to a second end such that the second end of the control rod is configured to be inserted in the guide and able to move within the guide without being displaced from the guide during movement of the piston within the inner bore. The pressure wave generator also may comprise a transducer slidably accommodated in the second end of the housing. The transducer can be configured to be coupled to the medium and adapted to convert a portion of the kinetic energy of the piston into a pressure wave in the medium upon impact of the piston with the transducer. The pressure wave generator also comprises a motive force generator configured to accelerate the movable piston toward the transducer, wherein on impact of the piston and the transducer, the second end of the control rod moves within the guide toward the second surface of the piston.

In another aspect, the guide extends longitudinally from the first surface of the piston to an inner end spaced from the second surface of the piston. The guide comprises a first cavity extending from an entrance at the first surface of the piston to a second cavity. The second cavity extends from the first cavity of the guide, wherein a cross-sectional area of the first cavity is smaller than a cross-sectional area of the second cavity. The guide may further comprise a waist between the first cavity and the second cavity, wherein a cross-sectional area of the waist is larger than the cross-sectional area of the first cavity and smaller than the cross-sectional area of the second cavity.

In one aspect, the pressure wave generator may further comprise a retainer that can be removably attached to the second end of the control rod. The retainer can have a first orientation permitting the retainer to be inserted into the guide, the retainer movable to a second orientation when disposed in the guide, wherein when in the second orientation, the retainer is inhibited from being displaced from the guide. The retainer has a first cross-sectional area when in the first orientation and a second cross-sectional area when in the second orientation. The guide has an entrance at the first surface of the piston, the entrance having a cross-sectional entrance area. The first cross-sectional area of the retainer may be less than the entrance area and the second cross-sectional area of the retainer may be greater than the entrance area. The pressure wave generator further comprises a lock configured to secure the second end of the control rod to the retainer. The lock may comprise a locking pin.

In one aspect, the pressure wave generator may also include a damper system configured to decelerate the control rod independently of the piston. The damper system may comprise a chamber having an opening, the chamber comprising fluid. The first end of the control rod can comprise a damper element configured to enter the chamber through the opening during movement of the piston toward the transducer, wherein the fluid in the chamber provides a resistive force on the damper element as the piston moves toward the transducer. The damper element has a cross-sectional area that is smaller than a cross-sectional area of the opening to the chamber, such that fluid in the chamber can flow out of the chamber as the damper element moves within the chamber. The damper system may also include one or more openings to allow the fluid to flow out of the chamber as the damper element moves within the chamber. The one or more openings can be configured to provide a desired amount of deceleration or resistive force on the control rod.

In another aspect, the motive force generator comprises a first motive generator configured to apply an initial motive force to move the piston from rest toward the transducer. The motive force generator may also comprise a second motive generator. The second motive generator may comprise a pressure vessel connected to the housing and configured to store fluid for applying a fluid pressure force to the movable piston, wherein the housing comprises one or more fluid ports disposed near the first end of the housing. The piston can be configured to block the fluid ports when the piston is disposed at the first end of the housing, and to open the fluid ports to provide fluid communication with the second motive generator as the piston moves away from the first end of the housing and toward the transducer due to the motive force of the first motive generator.

In one aspect, the transducer comprises a tapered portion configured to contact a portion of the housing to form a seal that inhibits flow of the medium into the inner bore of the housing.

In yet another aspect, the pressure wave generator may further comprise an impact detection system positioned at the second end of the housing and configured to detect impact of the piston with the transducer. The impact detection system may comprise a pin having a distal end biased against a surface of the transducer and a sensor to detect motion in the pin.

In one aspect, a piston system is disclosed. The piston system can be used with embodiments of the pressure wave generator. The piston system can comprise a piston having a first surface and a second surface and a piston axis extending from the first surface to the second surface. The piston may further comprise a guide extending longitudinally along the piston axis from the first surface at least partially toward the second surface. The piston system may also include a rod having a first end and a second end. The second end of the rod can be disposed in the guide and adapted to move within the guide while the first end of the rod remains outside of the guide. The piston system may also include a retainer adapted to hold the second end of the rod within the guide and to inhibit displacement of the second end of the rod out of the guide.

In one aspect, the guide comprises a first cavity extending from an entrance at the first surface of the piston to a second cavity extending from the first cavity to an inner end of the guide. The inner end can be spaced from the second surface of the piston, wherein a cross-sectional area of the first cavity is smaller than a cross-sectional area of the second cavity.

In another aspect, the retainer can be removably attached to the second end of the rod. The retainer can have a first orientation permitting the retainer to be inserted into the guide and the retainer can be movable to a second orientation when disposed in the guide. When in the second orientation and attached to the rod, the retainer can inhibit or prevent displacement of the second end of the rod from the guide.

In yet another aspect, the guide has an entrance at the first surface of the piston, and the entrance has a cross-sectional entrance area. The retainer has a first cross-sectional area when in the first orientation and a second cross-sectional area when in the second orientation. The first cross-sectional area of the retainer can be less than the entrance area and the second cross-sectional area of the retainer can be greater than the entrance area. The piston system can further comprise a lock configured to lock the rod and the retainer in the second orientation.

In one aspect, the pressure wave generator comprises a transducer configured to be coupled to the medium and a movable piston having a guide cavity with an inner end within the piston. A control rod can extend between a first end and a second end, with the second end disposed and movable within the guide cavity in the movable piston. The second end of the control rod can be configured to be retained in the guide cavity during movement of the piston. The pressure wave generator can include a motive force generator configured to accelerate the movable piston toward the transducer. Upon impact of the piston and the transducer, the second end of the control rod moves toward the inner end of the guide cavity.

In another aspect, the second end of the control rod comprises an orientable retainer, with the retainer having a first orientation that allows the retainer to be inserted into the guide cavity, and a second orientation that inhibits the retainer from being removed from the guide cavity.

In another aspect, the motive force generator comprises a second motive generator comprising a first cavity configured to store fluid to apply a fluid pressure to the movable piston, and a second cavity configured to be at least partially evacuated and to receive fluid from the first cavity. The movable piston can be configured to accelerate within the second cavity toward the transducer in response to the fluid pressure of the received fluid. The motive force generator further comprises a first motive force generator configured to apply a motive force to initiate movement of the piston from rest.

In one aspect, the pressure wave generator further comprises a damper system configured to apply a damping force to decelerate the control rod for at least a portion of the movement of the piston toward the transducer. The damper system may comprise a cavity containing a fluid, and the control rod may comprise one or more damper elements configured to enter the cavity during the at least a portion of the movement of the piston. Fluid resistance on the damper elements in the cavity can provide the damping force.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

FIG. 1A is cross-sectional view schematically showing an embodiment of a piston guide with a retainer. FIG. 1A shows the piston guide before the retainer is inserted into the piston guide.

DETAILED DESCRIPTION

Overview

Various methods can be used for launching a pressure wave in a medium, such as applying direct mechanical impact on the surface of a medium, detonation, explosions, electrical sparks, intense radiation beams, oscillating and amplifying mechanisms, etc.

Examples of pressure wave generators are described in the commonly owned U.S. Patent Publication No. 2010/0163130, which is incorporated by reference herein in its entirety. This publication describes examples of a pressure wave generator for generating a pressure wave (or a plurality of pressure waves) in a medium. Any of the example pressure wave generators, components of the generators, or methods for operating generators described in this publication can be used with the embodiments of pressure wave generation apparatus and methods described herein. The pressure wave can be used to compress the medium and increase its temperature, pressure, energy, and/or density. The pressure wave can be generated by a mechanical impact of an accelerated piston on a transducer coupled to the medium. The transducer can at least partially convert kinetic energy of the movable piston into a pressure wave in the medium. In order to achieve high energy pressure waves capable of enclosing and compressing material within the converging medium, substantially precise timing and control of the piston position and impact time can be used in some cases.

In some implementations, control of piston impact and timing can be provided by applying motive and restraining forces to the piston and by monitoring piston position. One possible method for controlling the impact timing is by using a rigid rod attached to the piston. The rod provides a surface on which a restraining force, such as provided by a brake, can be applied. In addition, the piston rod can be used for monitoring piston position. In some implementations, relatively sudden deceleration of the piston during impact on the transducer may cause damage to the rod such as, buckling of the rod, shear of its attachment point, or failure in tension due to rebound.

Accordingly, the present disclosure provides embodiments of pressure wave generators and pistons that may reduce damage on the control rod during impact in some implementations.

Examples of Pressure Wave Generators

Figure 1:
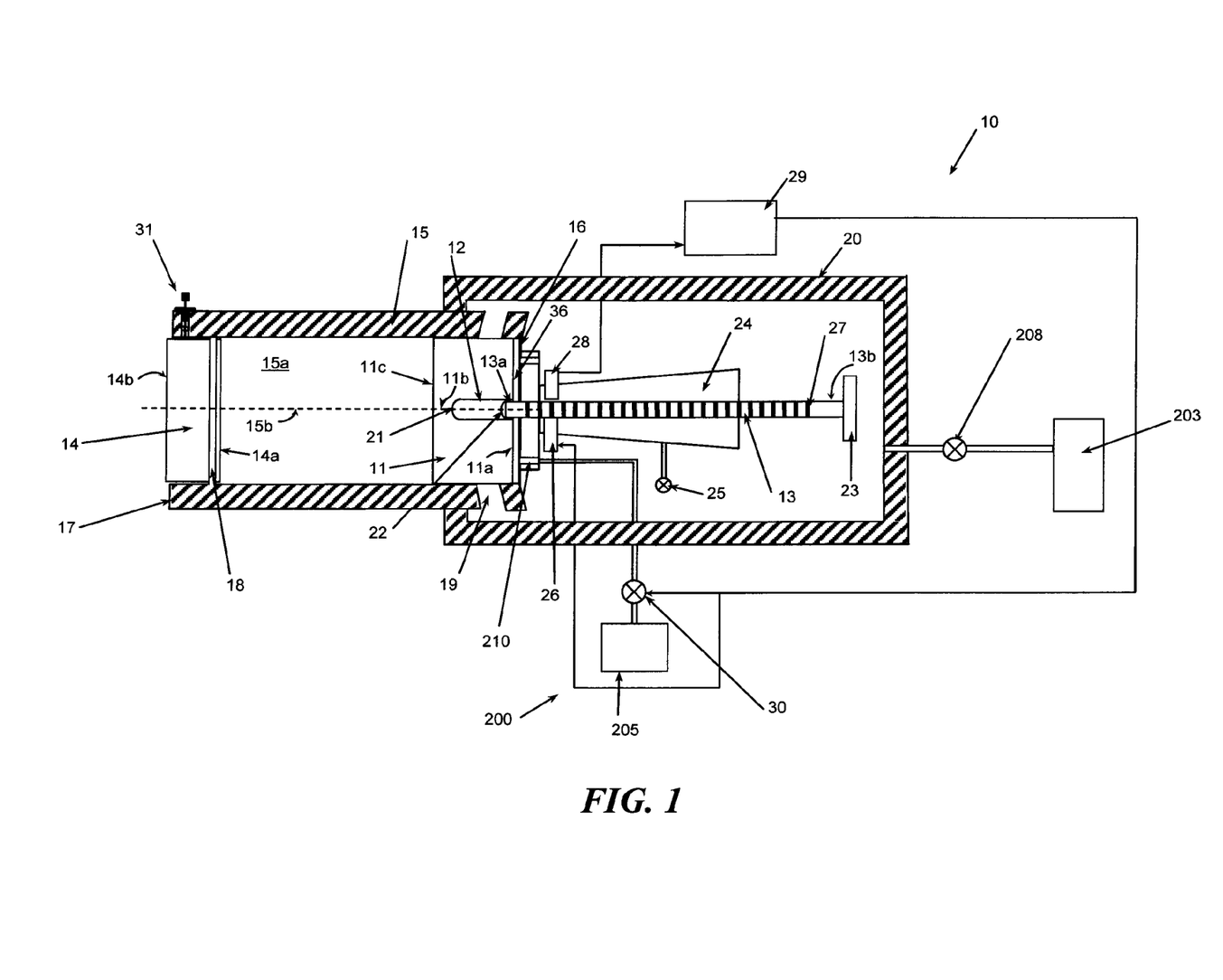
FIG. 1 is a schematic cross-sectional view of an embodiment of a pressure wave generator having a movable piston with a guide and a control rod that is slidable within the guide. The example pressure wave generator includes a control rod damper system and a piston launching system.

With reference to the drawings, a schematic cross-sectional view of an embodiment of a pressure wave generator 10 is shown in FIG. 1. The pressure wave generator 10 includes a cylindrical housing 15 having an inner bore 15a defined by the housing 15, a first end 16 and a second end 17; a piston 11 movable within the housing's inner bore 15a; and a transducer 14 located at the housing's second end 17. The second end 17 of the housing 15 may be an open end into which the transducer 14 is slidably accommodated. The first end 16 of the housing 15 may be at least partially closed. The inner bore 15a can extend longitudinally along a bore axis 15b. The piston 11 may have a longitudinal piston axis 11b extending along a direction from a first surface 11a to a second surface 11c. The second surface 11c faces toward the transducer 14. The piston 11 is movable in the inner bore 15a from the first end 16 toward the transducer 14 at the second end 17 along the bore axis 15b. The piston longitudinal axis 11b may be generally collinear with the bore axis 15b, so that the piston 11 moves within the inner bore 15a along a direction parallel to the piston axis 11b.

The inner bore 15a of the housing 15 may be evacuated with a pumping system (not shown) forming an at least partial vacuum region. In some implementations, the inner bore can be at least partially evacuated by the pumping system so that pressure within the inner bore is reduced relative to ambient pressure. The transducer 14 can be capable of being slightly displaced axially relative to the housing's second end 17 during an impact by the piston 11. The transducer 14 comprises an inner, impact, surface 14a facing the housing inner bore 15a and an outer surface 14b that can be coupled to a medium, such as a solid, a liquid, a gas, or a plasma. The transducer 14 further includes a holding mechanism 18 which prevents dislodgement of the transducer into the medium when impacted by the piston 11 (see also, the example transducer shown in FIG. 4). The housing 15 may also include a plurality of fluid ports 19 formed around the cylindrical housing 15 in proximity to its first end 16 through which the piston's inner bore 15a communicates with a pressure vessel 20. The pressure vessel 20 can store a pressurized fluid (e.g., gas) that can flow through the ports 19 and accelerate the piston 11 along the bore axis 15b (or the piston longitudinal axis 11b) toward the transducer 14 so that the second surface 11c of the piston impacts the impact surface 14a of the transducer 14. The impact of the piston 11 and the transducer 14 may cause the transducer 14 to be displaced along the bore axis 15b into the medium, thereby generating a pressure wave in the medium.

In the illustrated embodiment, the piston 11 and the transducer 14 are substantially cylindrical and fit within a cylindrical bore 15a. This is not a limitation, and in other embodiments the piston 11, the transducer 14, and/or the bore 15a can have shapes (e.g., different cross-sectional shapes such as polygons).

The piston 11 can comprise a guide 12, which can be configured so that a control rod 13 can be at least partially inserted into the guide 12. In the illustrated embodiment, the guide 12 comprises a central, elongated cavity that extends partly through the piston's body from the first surface 11a toward the second surface 11c. The piston guide 12 receives a distal (or second) end 13a of the control rod 13 and allows the control rod 13 to move or slide within the guide 12. A proximal (or first) end 13b of the control rod remains outside the guide 12. The guide 12 can extend to a certain length within the piston's body. In some implementations, the guide 12 can extend substantially throughout the entire body of the piston 11 (e.g., entirely to the second surface 11c). In other implementations, the guide 12 can extend to various depths within the piston's body but less than the length of the entire piston's body. The length of the guide 12 can be selected so that it provides a sufficient path for the rod 13 to slide or move therein during the impact of the piston 11 with the transducer 14, without being displaced from the guide 12 during movement of the piston 11 within the inner bore 15a.

In some embodiments, the piston 11 can have a substantially cylindrical body with a diameter of about 300 mm, a mass of about 100 kg and a length of about 180 mm. The piston 11 can be formed from a rigid material such as metal. The guide 12 can be an elongated cavity, concentrically positioned within the piston's cylindrical body, with a diameter of the guide's opening of about 50 mm and a length of about 140 mm. The guide 12 can have cylindrical, conical or any other cross-section. In the illustrated embodiment, the guide 12 has an inner end 21 having a shape that is substantially a portion of a sphere (e.g., hemispherical) to reduce or minimize the stress concentration on the inner end 21 of the guide 12. Other cross-sectional shapes of the guide can be used such as polygonal, and the inner end (or other portions of the guide) can be shaped differently than shown in FIG. 1 (e.g., flat, conical, etc.).

Figure 1A:
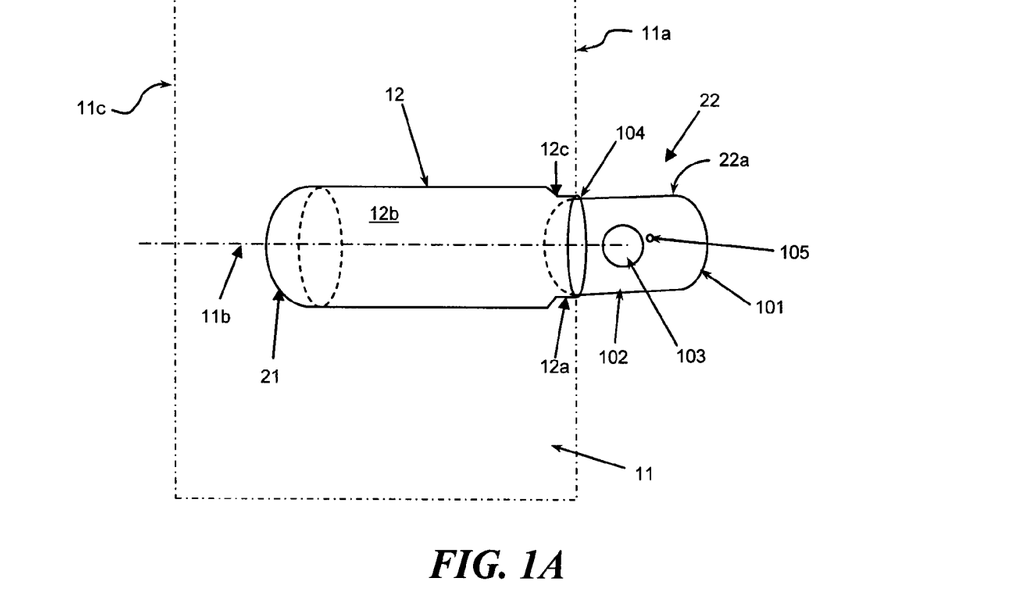
Figure 1B:
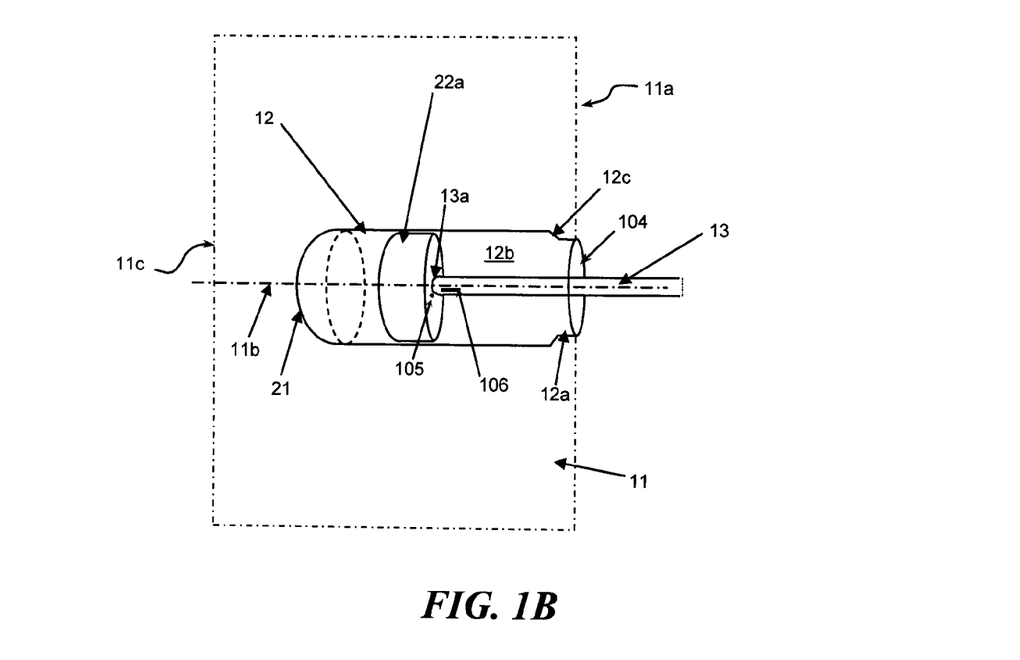
FIG. 1B is a schematic cross-sectional view of an embodiment of a control rod attached to a retainer within a piston guide.

FIG. 1A is cross-sectional view schematically showing an embodiment of the piston guide 12 with a retainer 22. FIG. 1A shows the piston guide 12 before the retainer 22 is inserted into the piston guide 12. FIG. 1B is a schematic cross-sectional view of an embodiment of the piston 11 with a distal end 13a of the control rod 13 attached to a retainer 22a within the piston guide 12. In the embodiments schematically shown in FIGS. 1A and 1B, the guide 12 comprises a second cavity 12b adjacent to a first cavity 12a. The inner end 21 of the guide 12 is disposed at a distal end of the second cavity 12b. The second cavity 12b narrows at a waist 12c to adjoin the first cavity 12a, which has a smaller cross-sectional area than the second cavity 12b. The first cavity 12a has an entrance opening 104 at the surface 11a of the piston 11. In the illustrated embodiments, the entrance 104 has a circular shape however, any other shape configured to receive the control rod 13 can be used.

In one implementation, the entrance 104 can be circularly shaped with diameter of about 30 mm. The second cavity 12b can have a diameter of about 50 mm and length of about 120 mm while the first cavity 12a can have a diameter of about 30 mm and a length of about 15 mm. The waist 12c can have a curved surface to avoid sharp edges.

As shown in FIGS. 1A and 1B, the pressure wave generator 10 can further comprise a retainer 22 to retain a portion of the control rod 13 within the guide 12. In one embodiment the retainer can be a shaped nut 22a that holds a portion of the rod 13 in the guide 12, allowing the portion of the rod to move substantially freely within the guide but preventing displacement of the distal end 13a of the rod 13 out of the guide 12 and thus out of the piston 11.

Embodiments of the retainer 22 are schematically illustrated in FIGS. 1A and 1B. In FIG. 1A, the retainer 22 comprises a shaped nut 22a that comprises a hemi-spherical body 101 with an opening 103 in which the control rod 13 can be inserted and secured. The shaped nut 22a can have two sections removed thereby forming two opposing flat surfaces 102. The shaped nut 22a can have two different cross-sections depending on the orientation of the shaped nut 22a in relation to the guide 12 and the entrance 104. In a first orientation (see, e.g., FIG. 1A) the shaped nut 22a is side faced having the opening 103 facing a wall of the guide 12 so that a cross-section of the shaped nut is smaller than a cross-section of the first cavity 12a (and the entrance opening 104) so that the nut 22a can be inserted through the entrance opening 104 and first cavity 12a (while in the first orientation) and then into the second cavity 12b. When the shaped nut 22a is within the second cavity 12b, the nut 22a can be rotated to a second orientation in which the opening 103 faces the entrance 104 (see, e.g., FIG. 1B), so that its cross-section is larger than the cross-section of the first cavity 12a and the entrance opening 104. Therefore, when the shaped nut 22a is in the second orientation within the second cavity 12b, the nut 22a is prevented from exiting the guide 12 through the entrance opening 104.

FIG. 1A schematically shows the orientation of the retainer 22 in relation to the guide 12 before the shaped nut 22a is inserted into the guide 12 through the entrance 104. The two opposing flat surfaces 102 help to obtain clearance in order to insert the shaped nut 22a through the entrance 104 in the first cavity 12a and into the second cavity 12b. Once the nut 22a is in the second cavity 12b of the guide 12, the nut can be rotated so that the opening 103 faces the entrance 104 so that the control rod can be connected to the retainer 22. The shaped nut 22a can be shaped so that the shape of the nut's distal end substantially matches the shape of the guide's inner end 21 (see, FIG. 1B).

FIG. 1B schematically shows the shaped nut 22a and the distal end 13a of the control rod 13 attached to the nut 22a and inserted within the piston guide 12. When the nut 22a is in the position shown in FIG. 1B, the cross-section of the nut 22a is slightly smaller than the cross-section of the second cavity 12b so that the nut 22a can move substantially freely within the second cavity 12b. The cross-section of the nut 22a is larger than the cross-section of the first cavity 12a (and/or the opening 104) so that the nut 22a is inhibited from exiting the guide 12 during operation of the pressure wave generator. For maintenance operations, the nut 22a can be removed from the guide 12 by detaching the control rod 13 from the nut 22a, and rotating the nut 22a so that it can be removed from the cavities 12b, 12a and through the entrance 104. In one implementation, the nut 22a can be rotated with a tool designed to rotate the nut 22a to insert or withdraw the nut 22a through the cavities 12b, 12a and the opening 104.

In some embodiments, the retainer 22 can further comprise a lock to secure the control rod 13 and the retainer 22 in a fixed position. The lock may include a locking pin (e.g., a locking wire) 106 placed in a narrow slot on the control rod 13 (see, e.g., FIG. 1B). The locking pin 106 can be adapted to pass through an opening 105 formed in the retainer 22 in proximity to the opening 103 of the shaped nut 22a (see, e.g., FIG. 1A), so that when the control rod 13 is fastened to the retainer 22, the locking pin 106 can be aligned with the opening 105. The locking pin 106 can pass through the opening 105, thereby securing the control rod 13 in a substantially fixed position in relation to the nut 22a. For example, once the retainer 22 is fasten (e.g. threaded) on the rod's second end 13a, the locking pin 106 passes through the opening 105 thereby locking the position of the retainer 22 and the rod 13, thus preventing the retainer 22 to unwind and detach from the rod 13. In some embodiments a plurality of locks may be employed. In other embodiments different locking mechanisms can be used to secure, in substantially fixed position, the control rod 13 and the retainer 22.

In some methods of attachment, the retainer 22 is inserted in the piston guide 12 and then is rotated by about 90 degrees until the opening 103 faces the entrance hole 104. The control rod 13 is then inserted into the opening 103 and fastened to the retainer 22 (e.g. with a thread), and the locking pin 106 is aligned with and inserted into the opening 105, locking the position of the control rod 13 and the retainer 22. When the rod 13 is fixed and locked to the retainer, the rod 13 (and retainer 22) can move or slide within the second cavity 12b of the guide 12, but the cross-sectional size of the retainer 22 substantially prevents the retainer 22 and the distal end 13a of the control rod 13 from exiting the guide 12 through the first cavity 12a or the opening 104. Accordingly, the distal end 13a of the control rod 13 can move along the length of the guide 12 but is inhibited from being displaced or dislodged from the guide 12.

With further reference to the example pressure wave generator shown in FIG. 1, the proximal end 13b of the control rod 13, opposite of the distal end 13a within the piston guide 12, can be connected to a disk 23 which is configured to act as a piston when it moves into a damper system 24. In other embodiments, one or more damper elements (such as disks) may be disposed along the length of the control rod 13 outside the guide 12 (in addition to or as an alternative to the disk 23) to provide deceleration of the rod 13 in the damper system 24. The damper system 24 can decelerate the control rod 13 independently of the movement of the piston 11 and can thereby reduce or minimize the stress on the rod 13. The damper system 24 can include a pneumatic damper (e.g., as schematically shown in FIG. 1), a hydraulic damper, and/or an electromagnetic damper/brake. The pneumatic or the hydraulic damper can be equipped with an adjustable valve 25 which can be used to adjust the deceleration of the control rod to reduce or minimize the stress on the rod 13. In some implementations, the damper system 24 can include a cylindrical body with an entry opening through which the disk 23 enters the damper system. In another embodiment, the damper system 24 can be conically shaped (see FIG. 1). The length and/or cross-sectional area of the damper system 24 can be selected (among other factors such as the disk 23 size) to provide a desired deceleration to or damping force on the control rod 13.

In some implementations the damper system 24 can have a profile that varies along the length of the damper system 24. For example, the damper system 24 can have a body with a first portion being substantially cylindrical and a second portion adjoining the first portion having a bell shape. The first portion of the damper system 24 can have an entrance that is made of an elastomeric, a plastic, or a rigid rubber material or any other shock resistive material. Use of such material may be advantageous such that if the disk 23 hits the entrance of the damper system 24, the entrance will yield without breaking. The disk 23 can be sized and shaped so that when it is at the entrance of the damper system 24, the disk provides a gap through which a gas can flow out of the damper system 24 (e.g., for a pneumatic damper system). For example, the disk 23 may have a cross-sectional area that is slightly smaller than a cross-sectional area of the entrance to the damper system 24. The damper system 24 may, in some cases, further comprise at least one additional opening positioned along the length of the damper system 24 through which the gas can pass out of the damper system 24. In one implementation, different number or size of openings can be positioned or formed at various locations in the damper system 24 to allow gas flowing out of the damper 24 to control or moderate the damping force applied to decelerate the control rod 13.

In one example method of operation, at the starting position of the piston 11 near the closed end 16 of the bore, the retainer 22 and the control rod 13 are in their own starting positions. The retainer 22 and the distal end 13a of the control rod 13 may be spaced from the inner end 21 of the guide 12. The piston 11 can be accelerated forward to impact the transducer 14. On the impact of the piston 11 and the transducer 14, the distal end 13a of the control rod 13 having the retainer 22 can move forward within the guide 12, thereby reducing the stress to the rod 13. As the distal end 13a of the control rod 13 moves forward within the guide 12, the disk 23 moves forward in the damper system 24. In a pneumatic damper system, movement of the disk 23 compresses the gas (e.g., air) within the damper system 24 and slows down the control rod 13. Thus, the damper system 24 acts to decelerate the rod 13 and thus reduces or minimizes the stress on the rod.

In one embodiment, the damper system 24 can be equipped with a high speed adjustable valve, such as a piezoelectric adjustable valve, which can be used as part of an impact timing control mechanism 29. The high speed adjustable valve can be used to adjust the force on the rod 13 before impact with the transducer, thereby changing the piston's velocity for the last portion of its travel prior to impact with the transducer 14 (e.g., during the portion of travel when the disk 23 enters the damper system 24).

Once the piston 11 returns to its starting position near the end 16 of the bore, the control rod 13 can be returned to its starting position within the guide 12 by applying a force to the rod 13 to move it back to its starting position, such that the distal end 13a of the rod 13 and the retainer 22 are spaced from the inner end 21 of the guide 12.

In some implementations, the timing of the impact of the piston 11 on the transducer 14 can be controlled by the control system 29. The control system 29 may include one or more processors, controllers, or general or special purpose computing hardware. The pressure wave generator 10 can comprise a brake 26 for applying a restraining force to the control rod 13. For example, the brake 26 may comprise a magnetic eddy current brake, a frictional brake, a piezoelectric controllable brake, etc. The control rod 13 may further includes markings 27 such that the control system 29 can monitor the piston's position by using an optical system to read the rod's markings 27 with a position encoder 28. The encoder 28 can send a signal regarding the piston's position to the control system 29.

In various implementations, the control system 29 can control impact timing between the piston 11 and the transducer 14 and/or can control speed and/or location of the piston 11 for at least a portion of the piston's movement within the generator 10. In one implementation, the control system 29 can receive the signal of the piston's position from the encoder 28 as an input and can send output signals to the brake 26 and/or a valve 30 which is part of a piston launching system 200 (see, e.g., FIG. 2). For example, the control system 29 can access control information from one or more previous shots of the piston 11 and can use such control information to make adjustments to control parameters for subsequent shot(s) of the piston 11. The control information can include, for example, a trajectory of the piston, launching system delays, gas pressure(s) within the generator 10, measurements or determinations of friction within the housing 15, the position of the piston 11 in relation to the transducer 14 at the time of the impact, etc. The control system 29 can make adjustments to, for example, launching timing, gas pressure(s), position of the transducer/piston, and so forth in order to adjust impact force and/or impact time. The control system 29 can include or be in communication with one or more computer-readable storage media that can be used to store, persistently or otherwise, the control information. For example, the control system 29 can include a physical computing device in communication with a volatile or non-volatile storage device that stores the control information.

Different types of brake systems can be used for applying a restraining force to the rod 13. Commonly owned U.S. Patent Publication No. 2010/0163130, incorporated by reference herein in its entirety, describes some embodiments of brake systems that can be used with embodiments of the pressure wave generator 10. For example, the brake 26 can comprise a piezo-actuated friction brake, a solenoid actuated friction brake, an electromagnetic brake (e.g., using eddy currents), etc. In some embodiments, the brake 26 can be preloaded with a desired braking force. In other embodiments the pre-loading force of the brake 26 can be accurately measured and controlled by, for example a load cell (not shown). In one implementation, a load cell may comprise a piezoelectric actuator that can be connected to a brake shoe and can be in electrical communication with a voltage driver. A bolt can be connected to the actuator to pre-load the brake by tightening the bolt. When the piezoelectric actuator is squeezed or compressed, the actuator generates electrical current (voltage). Measuring the voltage generated by the actuator can provide a measurement of the brake pre-loading force. Accurate measurements and control of piston position and braking force can allow accurate control of impact timing and/or impact force by the control system 29. In some implementations the control system can control the impact timing with an accuracy of about ±10 µs.

In some methods of operating the pressure wave generator 10, the piston 11 is repeatedly impacted on the transducer 14 in successive "shots." Calibration of the timing of the shots, velocity (or kinetic energy or momentum) of the piston, and so forth may be desired. In some cases, to calibrate successive shots of the piston 11 onto the transducer 14, the moment at which the piston 11 impacts the transducer 14 can be accurately determined. The force of the impact may cause substantial loads to be imparted onto one or more surfaces of the piston or the piston's housing. Such loads can be used to detect the impact timing via a displacement or acceleration measurement. In some cases, the measurement accuracy may be affected by variability in an acoustic path. For example, if an impact sensor is placed on the upper part of the piston housing 15, and an impact force is initially applied or received by the lower part of the piston's housing, the impact sensor on the upper part of the housing 15 will not receive a signal from the impact until the pressure signal has propagated across the piston 11 or housing 15. As one illustrative example, for a steel piston with a diameter of 300 mm and assuming a 5 km/s sound speed in steel, the delay in the sensor reading at the upper part of the housing 15 could be about 60 µs. Therefore, some embodiments of the pressure wave generator 10 use an impact detection sensor 31 that is capable of detecting radial expansion of the transducer 14 upon impact. Such an impact detection sensor 31 can further be configured to be used as a positioning sensor for monitoring transducer position upon the impact of the piston, and its retrieve to an initial position (position before the impact). Multiple impact detection sensors 31 can be used in some embodiments.

The impact detection sensor 31 can be placed on a portion of the housing 15 that accommodates the transducer 14, such as for example, a transducer seat 400 (see, e.g., FIG. 4), and can be in communication with the transducer 14. FIG. 1 schematically illustrates an example placement of the impact detection sensor 31 on an upper portion of the housing 15. The impact detector sensor 31 can include a pin and an accelerometer or any other sensor capable of detecting a movement in the pin. The pin can be preloaded against the transducer 14 by a biasing element such as, e.g., a spring. Mechanical springs, differential gas pressures, or gas struts can be used as a biasing element. The impact detector sensor 31 may further include a seal to substantially seal the transducer 14 from the atmosphere. In embodiments in which the biasing element comprises a differential gas pressure sensor, the seal may be optional. The impact detector sensor 31 can further include a switch to indicate a position of the transducer 14 (for example when the transducer 14 returns to its initial position within the seat 400). In some implementations, the impact detector can comprise a cooling system to prevent sensor 31 (accelerometer and/or position switch) from becoming overheated.

The pin in the impact detection sensor 31 can be formed from a metal or any other material that has sufficiently high sound speed and the ability to withstand the resulting stress forces and can transmit the radial expansion of the transducer 14 to the accelerometer. The pin can extend toward, and a distal end of the pin can touch, the transducer 14, in order to sense a pressure wave that traverses through the transducer 14 upon the impact of the piston 11. In other embodiments, the impact detection sensor 31 can comprise a sensor capable of detecting the radial expansion of the transducer. The impact detection sensor 31 can include an optical or capacitive sensor, which may be placed directly on the transducer surface.

Figure 2:
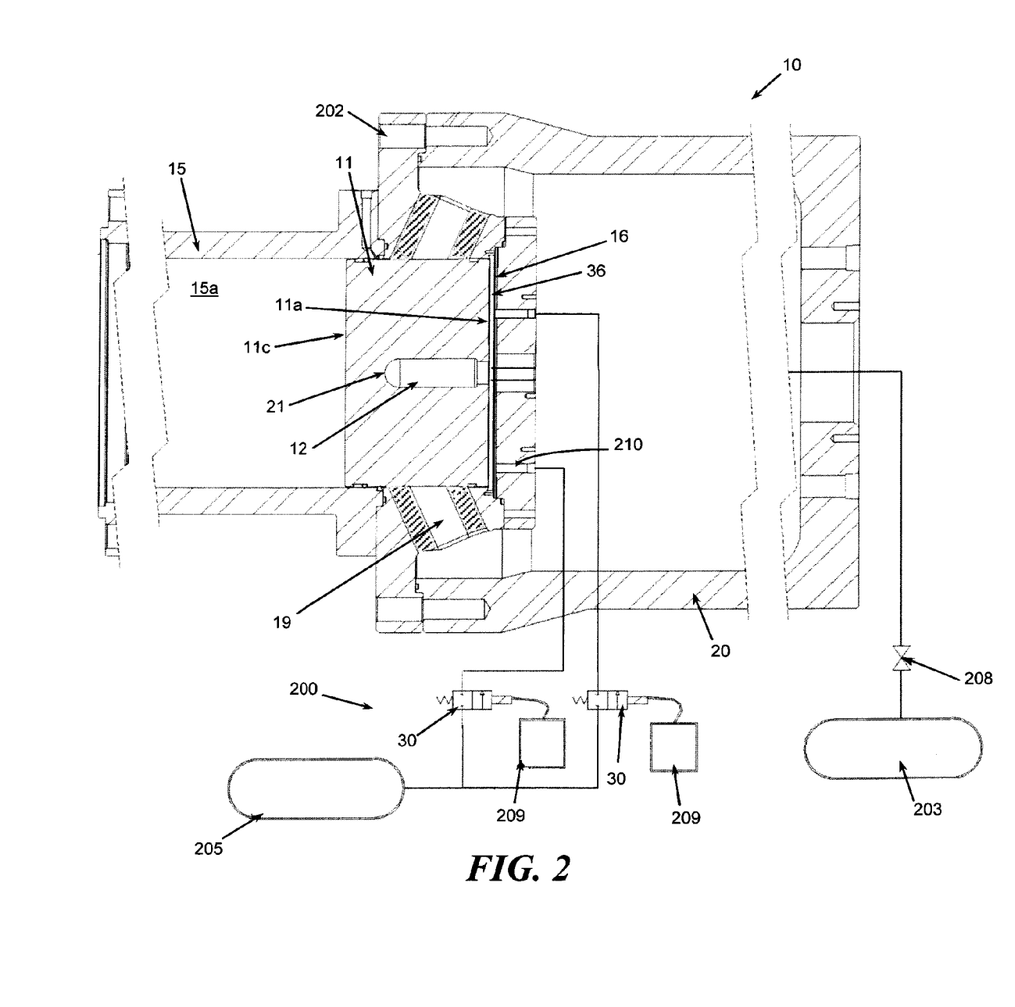
FIG. 2 is a cross-sectional view schematically showing an embodiment of a pressure wave generator with a piston in its starting position.

FIG. 2 schematically illustrates a cross-sectional view of an embodiment of a pressure wave generator 10 comprising a pressure vessel 20 attached to the piston housing 15. In FIG. 2, the piston 11 is shown in its starting position near the first end 16 of the inner bore 15a. The pressure vessel 20 can be fastened to the piston housing at its first end 16 through a fastening mechanism 202 (e.g., bolts) and fluid (e.g., gas) in the pressure vessel 20 can be in fluid communication with the piston's inner bore 15a through ports 19 (see also, FIGS. 1 and 3). A pressurized gas reservoir 203 and control valve 208 can supply a pressurized gas into the pressure vessel 20. Various possible methods for launching the piston 11 toward the transducer 14 are described in commonly owned U.S. Patent Publication No. 2010/0163130, which is hereby incorporated by reference herein in its entirety.

In some implementations of the pressure wave generator 10, timing of the start of piston motion (launch) can be precisely measured or controlled to provide improved control of the timing of impact with the transducer 14 (impact). In some such implementations, a cost effective and readily controllable method of providing motive force on the piston is by employing a pressurized gas. In one example method for launching and accelerating the piston 11 toward the transducer 14, the pressure vessel 20 is brought to an initial pressure, while the piston is kept in a steady position by applying a braking force on the control rod 13 (e.g., by the brake 26). At launch, the braking force can be released rapidly (on order of several micro-seconds when using a piezoelectric brake actuator in some embodiments), and the force of the pressurized gas can accelerate the piston 11 toward the transducer 14. In certain such embodiments, the pressurized gas driver may cause a premature launch if the brake parameters are not accurately predicted. Also, some such embodiments may tend to slightly retard the piston motion since the increase in the volume behind the piston at launch tends to rapidly lower the pressure pushing the piston.

Therefore, certain embodiments of the pressure wave generator 10 employ a launching system 200 which comprises a series of timed valves, such as pneumatic (puff) valves 30, which can be used to directly inject high pressure gas into a relatively small volume 36 behind the piston (see, e.g., FIGS. 1 and 2) to tune an initial motive force applied to the piston 11. The valves 30 can be in communication with an independently regulated gas supply 205 (e.g., pressurized air). In other embodiments, the gas supply 205 can be the primary gas supply (such as a pressurized gas reservoir 203). In one embodiment, a pressurized gas in the pressure vessel 20 can be used to supply high pressure gas into the volume 36. The independent gas supply 205 can be tuned for each puff valve 30 to achieve opening synchronization within tens of microseconds in some implementations. The puff valves 30 can inject the pressurized gas through channels 210 into the small volume 36 behind the piston. As schematically shown in FIGS. 1 and 2, the volume 36 can be a relatively small gap formed between the piston's back surface 11a and the housing's first end 16. In one method of operation, an initial launching gas pressure can be introduced into the volume 36, while the piston is kept in a steady position by applying a braking force on the control rod (not shown in FIG. 2). At launch, the braking force can be released and the pressurized gas in the volume 36 can provide an initial motive force to start moving the piston 11. The pressurized gas of the volume 36 applies the initial motive force on the piston 11 to move it past a set of gas ports 19 (see, e.g., FIG. 3) through which additional pressurized gas, stored in the pressure vessel 20, can be applied to the piston 11 to accelerate it toward the transducer 14. In such embodiments, the piston 11 acts as a valve on the gas ports 19 to open the pressure vessel 20 and introduce an additional motive force onto the back of the piston 11 after the piston 11 has passed the gas ports 19.

For example, the launching system 200 may include four valves 30 that inject a gas at about 100 psi (1 psi=1 pound per square inch≈6,895 Pascals) in the volume 36 to start moving the piston 11 forward down the piston's bore at a speed of about 2 m/s. Once the piston 11 passes the gas ports 19, a highly pressurized gas at about 350 psi or higher from the pressure vessel 20 enters the volume behind the piston 11 and accelerates the piston to a speed of about 30 to 100 m/s.

Figure 3:
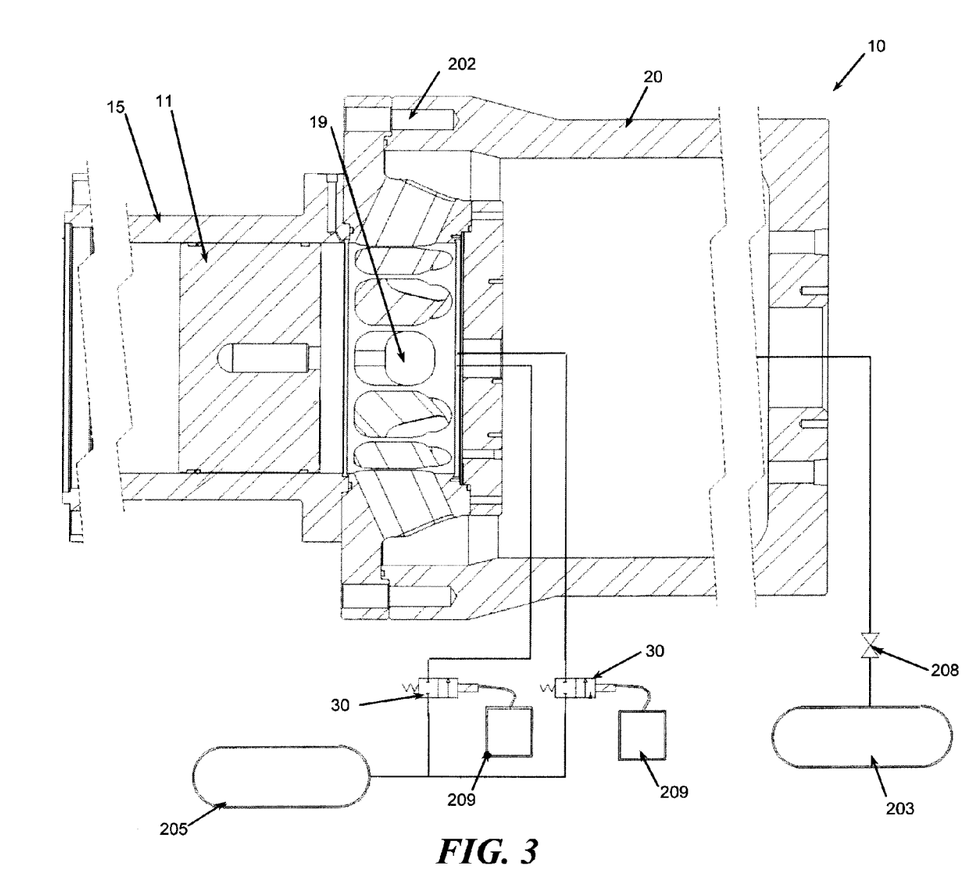
FIG. 3 is a cross-sectional view schematically showing an embodiment of a pressure wave generator with the piston moved forward (e.g., away from the starting position of FIG. 2) showing open gas ports that may provide additional motive force to the piston.

In one embodiment, the launching system 200 may comprises fewer or more valves 30 to provide the initial motive force to the piston 11. In another embodiment, the valves 30 can be connected to independent valve timing controllers 209 that control the amount of gas each valve 30 injects behind the piston 11. The injected pressurized gas provides enough motive force on the piston 11 to move it forward down the cylindrical bore to pass the gas ports 19, as shown in FIG. 3.

In different implementations, different types of valves or launching mechanisms, at different pressures can be applicable for applying initial motive force to the piston 11. Other embodiments can provide launch control using direct-acting piezoelectrics, spring-driven mechanisms, inertia-driven mechanisms (e.g., flywheels or similar devices), or thermal actuators.

In some methods of operation, when the pressure wave generator 10 is in a start position, the piston 11 can be in the position schematically shown in FIGS. 1 and 2, in which the piston 11 covers the gas ports 19. While in the start position, the piston 11 therefore inhibits gas from entering the inner bore of the housing 15 through the gas ports 19. A control system 29 can send a signal to the brake 26 to apply a braking force to the control rod 13. The control system 29 can send a signal to the valve controllers 209, signaling the valves 30 to open. At a desired time, the control system 29 can signal the brake 26 to decrease (or eliminate) the braking force. The piston 11 begins to move passing the gas ports 19, as shown in FIG. 3, allowing the pressurized gas stored in the pressure vessel 20 to pass through the gas ports 19 and accelerate the piston 11 toward the transducer 14. When the piston 11 impacts the transducer 14, it transfers at least part of its kinetic energy to the transducer. On the impact, the transducer may be elastically compressed and axially displaced at least partly into the medium, thus at least partially converting the kinetic energy of the piston into a pressure wave in the medium. During impact of the piston 11, the distal end of the control rod 13 (and/or the retainer 22) can move or slide forward within the guide 12, which may reduce the stress on the rod generated during the impact. The damper system 24 can decelerate the control rod 13 independently from the piston 11 and may reduce or minimize the stress on the rod.

The propagation of the stress wave from the solid components (e.g., the piston 11 and the transducer 14) into the medium can provide the pressure wave in the medium. When such stress waves are associated with large impact velocities of the piston on the transducer (e.g., velocities greater than about 10 m/s in some cases), such waves can cause local pressures which may exceed 1 GPa in some implementations of the generator 10. Such pressures may be caused by the motion of the transducer 14 into the medium, as well as by the radial expansion of the transducer as the pressure wave traverses the transducer. The radial expansion may cause portions of the medium that may be disposed along the sides of the transducer to be ejected as a "jet." Such a "jet" may damage seals used in the generator 10 near the transducer 14. Also, seals may be degraded under high pressures generated in certain embodiments.

Figure 4:
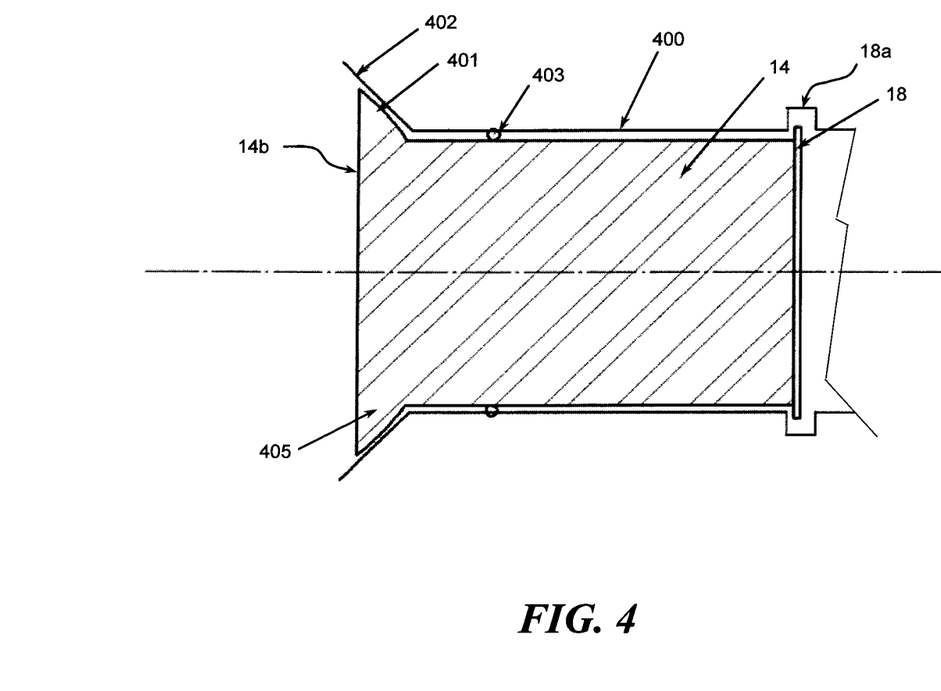
FIG. 4 is a cross-sectional view schematically showing an embodiment of a transducer.

FIG. 4 shows a cross sectional view of an embodiment of a transducer 14 which is shaped so that it can act as a primary seal for the end 17 of the inner bore of the housing 15 of the pressure wave generator 10. The transducer 14 comprises a surface 401 that faces a surface 402, which is formed as part of the transducer's seat wall 400 in the housing 15. The surface 401 of the transducer 14 may comprise an angled surface (having one or more angled portions) or a rounded or curved surface. The surface 402 of the seat wall 400 may comprise a corresponding tapered flat surface or a rounded or curved surface. The surface 401 of the transducer 14 can be designed to substantially mate with the surface 402 of the seat wall. In one embodiment the surface 402 can be part of the piston housing wall. The configuration of the surface 401 and the surface 402 can provide a primary seal which, during operation of certain generator embodiments, can squeeze out or eject at least a portion of the medium that may be trapped in the space between the transducer 14 and its seat 400. The portion of the medium may be squeezed out or ejected when the transducer returns to its starting position in the seat 400 following impact by the piston.

In another embodiment, a secondary seal 403 further can be utilized. The secondary seal can be made of a material which is capable of handling exposure to the medium, high temperature, high pressure and frictional forces caused by slight movement of the transducer 14. In one implementation, the seal 403 additionally can act as a lubricator. A possible advantage of embodiments using both primary and secondary seals is that the primary seal can limit the pressure exposure of the secondary seal so that the secondary seal is subject to lower pressures as compared to embodiments not using the primary seal. Accordingly, a wider range of sealing materials can be used for the secondary seal, since the sealing material is subjected to lower pressures in such embodiments. For example, the secondary seal 403 can comprise a flexible graphite seal such as, e.g., a GRAFOIL® seal, or a GRAFOIL® die-formed ring available from EGC Enterprises Inc. (Chardon, Ohio).

Also, in certain such embodiments, the transducer 14 can provide the primary metal-to-metal seal formed by the transducer's outer surface 401 on the surface 402 of the seat 400, and a secondary, circumferential seal 403. Certain such embodiments may provide several functions including, e.g.: creating a primary seal between two substantially hard components (e.g., a metal transducer and its metal seat) so that the obtained seal geometry provides desired sealing under increased pressure. Also, the pressure of the medium on the transducer can energize the seal, which may increase the stability of the seal with increasing pressure.

Embodiments of the transducer 14 shown in FIG. 4 may also provide an expanding volume on the sides of the transducer 14 as it moves forward (e.g., upon impact of the piston 11), which may slow penetration of the medium along the sides of the transducer. In one implementation, a draining system (not shown) can be provided to remove any medium that penetrates through the primary seal (e.g., the metal-to-metal seal formed by surfaces 401 and 402) and/or the secondary seal 403. The draining system can further comprise a sensor to indicate any medium in the draining system and thus leakage of the primary and/or secondary seals. The configuration schematically shown in FIG. 4 may also provide one or more turns or angles in the medium's path to the secondary seal 403, which may inhibit formation of a jet of the medium.

The transducer 14 can be secured within the transducer seat 400 through the holding mechanism 18 that prevents dislodgement of the transducer into the medium when impacted by the piston 11. The holding mechanism 18 may include a retaining ring connected to the transducer body as shown in FIG. 4. The outer edge of the retaining ring can be disposed in a cylindrical groove formed in the seat 400. When the transducer 14 is inserted within the seat 400 the outer edge of the retaining ring enters the groove 18a, which inhibits or prevents the dislodgement of the transducer out of the seat 400 following impact by the piston. In some implementations, the retaining ring is positioned within an undercut formed in the outside diameter of the transducer. In one embodiment, a split retaining ring having at least two segments can be used as a component in the holding mechanism 18. Additionally, one or more seals and/or bearings can be provided to the holding mechanism 18 to secure the transducer 14 within the seat 400.

Since the transducer 14 and the medium will typically comprise different materials (or different phases of material, e.g., solid and liquid), an acoustic impedance mismatch at the transducer's surface 14b facing the medium may occur. The impedance mismatch can cause a reflection of acoustic energy back towards the piston impact surface 11c, which may cause the transducer 14 to rebound at least partially away from the medium. Embodiments of the transducer 14 can provide an improved acoustic impedance match to the medium. For example, the embodiment of the transducer 14 schematically shown in FIG. 4 comprises a tapered end 405 that provides a greater area that interacts with the medium, which may improve the efficiency of the pressure wave transfer and which may reduce the reflected acoustic energy. The embodiment shown in FIG. 4 also provides various hard surfaces 401, 402, 400, and 18 relative to which the transducer 14 can be located for accurate timing control during operation of the pressure wave generator 10. Additional embodiments of a transducer that can be used with the pressure wave generators 10 disclosed herein are described in the commonly owned U.S. Patent Publication No. 2010/0163130, which is hereby incorporated herein by reference in its entirety. Various curvatures of the surface 401 or 402 can be used. Also, a wide range of materials can be used for fabricating the transducer and/or the transducer's seat. For example any forging steel with sufficient strength to withstand the impacts can be used for fabricating the transducer 14 and the piston 11.

Examples of Uses for Pressure Wave Generators

Embodiments of the pressure wave generator can be used to transmit pressure waves into any suitable medium (e.g., solid, liquid, gas, and/or plasma). In some implementations, the pressure wave generator can be used as a press for stamping, embossing, bending, flanging, coining, blanking, punching, or working materials such as, e.g., metals (e.g., metalworking). In some implementations, the medium comprises a liquid, a gas, or a mixture of liquid and gas. In some such implementations, the medium comprises a liquid metal, such as liquid lead or a mixture of liquid lead and lithium. The pressure wave generator can be used to generate pressure waves in the medium, which may raise the pressure, temperature, energy, and/or density of the medium, and may increase the rate of chemical reactions in the medium. For example, embodiments of the pressure wave generator could be used for controlling a piston in a gas-powered engine (e.g., a steam engine).

The embodiments of the pressure wave generator disclosed herein may be used for generation of other energy forms which could result from a concentration of the acoustic energy. Such energy forms can be used for generation of localized hot spots, ultraviolet (UV) radiation, x-rays, medical isotopes, neutrons, fusion, and by-products of such acoustic energy conversion and concentration. For example, some embodiments of the pressure wave generator can be used to increase the pressure in a nuclear reaction chamber containing a medium (such as liquid lead or liquid lead-lithium) such that nuclear reaction rates are increased sufficiently to provide neutron generation or fusion reactions.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. A pressure wave generator for generating a pressure wave in a medium, the pressure wave generator comprising:
 a movable piston having a first surface and a second surface and a longitudinal axis between the first surface and the second surface, the piston comprising a guide extending along the longitudinal axis of the piston from the first surface at least partially toward the second surface;
 a housing having an inner bore, a first end, and a second end, the piston being at least partially disposed within the inner bore of the housing, the piston movable within the inner bore of the housing from the first end toward the second end along a direction parallel to the longitudinal axis of the piston;
 a control rod extending longitudinally from a first end to a second end, the second end of the control rod configured to be inserted in the guide and able to move within the guide without being displaced from the guide during movement of the piston within the inner bore;
 a transducer slidably accommodated in the second end of the housing, the transducer configured to be coupled to the medium and adapted to convert a portion of the kinetic energy of the piston into a pressure wave in the medium upon impact of the piston with the transducer;
 a retainer that is removably attached to the second end of the control rod, the retainer having a first orientation permitting the retainer to be inserted into the guide, the retainer movable to a second orientation when disposed in the guide, wherein when the retainer is in the second orientation and attached to the control rod, the retainer is configured such that moving the retainer into the first orientation is prohibited by the rod and the retainer is prevented from being displaced from the guide;
 a motive force generator configured to accelerate the movable piston toward the transducer; and
 an impact detection system configured to detect impact of the piston with the transducer and a position of the transducer,
 wherein on impact of the piston and the transducer, the second end of the control rod moves along a longitudinal axis of the guide toward the second surface of the piston.

2. The pressure wave generator of claim 1, wherein the guide extends longitudinally from the first surface of the piston to an inner end spaced from the second surface of the piston.

3. The pressure wave generator of claim 1, wherein the guide comprises a first cavity extending from an entrance at the first surface of the piston to a second cavity extending from the first cavity of the guide, wherein a cross-sectional area of the first cavity is smaller than a cross-sectional area of the second cavity.

4. The pressure wave generator of claim 3, wherein the guide further comprises a waist between the first cavity and the second cavity, wherein a cross-sectional area of the waist is larger than the cross-sectional area of the first cavity and smaller than the cross-sectional area of the second cavity.

5. The pressure wave generator of claim 1, wherein the guide has an entrance at the first surface of the piston, the entrance having a cross-sectional entrance area, the retainer has a first cross-sectional area when in the first orientation and a second cross-sectional area when in the second orientation, wherein the first cross-sectional area of the retainer is less than the entrance area and the second cross-sectional area of the retainer is greater than the entrance area.

6. The pressure wave generator of claim 1, further comprising a lock configured to lock the second end of the control rod in a fixed position in relation to the retainer when the retainer is in the second orientation.

7. The pressure wave generator of claim 1, further comprising a damper system configured to decelerate the control rod independently of the piston.

8. The pressure wave generator of claim 7, wherein the damper system comprises:
 a chamber having an opening, the chamber comprising a fluid;
 the first end of the control rod comprises a damper element configured to enter the chamber through the opening during movement of the piston toward the transducer, wherein the fluid in the chamber provides a resistive force on the damper element as the piston moves toward the transducer; and
 one or more openings to allow the fluid to flow out of the chamber as the damper element moves within the chamber.

9. The pressure wave generator of claim 1, wherein the motive force generator comprises a first motive generator configured to apply an initial motive force to move the piston from rest toward the transducer.

10. The pressure wave generator of claim 9, wherein the motive force generator comprises a second motive generator comprising:
 a pressure vessel connected to the housing and configured to store fluid for applying a fluid pressure force to the movable piston,
 wherein the housing comprises one or more fluid ports disposed near the first end of the housing, and
 wherein the piston is configured to block the fluid ports when the piston is disposed at the first end of the housing, and to open the fluid ports to provide fluid communication with the second motive generator as the piston moves away from the first end of the housing and toward the transducer due to the motive force of the first motive generator.

11. The pressure wave generator of claim 1, wherein the transducer comprises a tapered portion configured to contact a portion of the housing to form a seal that inhibits flow of the medium into the inner bore of the housing.

12. The pressure wave generator of claim 1, wherein the impact detection system is positioned at the second end of the housing and comprises a pin having a distal end biased against a surface of the transducer and a sensor to detect motion in the pin and the position of the transducer.

* * * * *

UNITED STATES PATENT AND TRADEMARK OFFICE
CERTIFICATE OF CORRECTION

| | |
|---|---|
| PATENT NO. | : 8,887,618 B2 |
| APPLICATION NO. | : 14/000725 |
| DATED | : November 18, 2014 |
| INVENTOR(S) | : Lon McIlwraith et al. |

It is certified that error appears in the above-identified patent and that said Letters Patent is hereby corrected as shown below:

In the Specification

In column 1 at approximately line 10, change "8012," to --2012--.

Signed and Sealed this
Thirtieth Day of June, 2015

Michelle K. Lee
*Director of the United States Patent and Trademark Office*